(12) United States Patent
Jin et al.

(10) Patent No.: US 7,539,719 B2
(45) Date of Patent: May 26, 2009

(54) METHOD AND APPARATUS FOR PERFORMING MULTIPLICATION IN FINITE FIELD GF($2^N$)

(75) Inventors: Weon-il Jin, Suwon-si (KR); Mi-suk Huh, Suwon-si (KR); Kyung-hee Lee, Yongin-si (KR); Bum-jin Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 961 days.

(21) Appl. No.: 10/965,907

(22) Filed: Oct. 18, 2004

(65) Prior Publication Data

US 2005/0086278 A1   Apr. 21, 2005

(30) Foreign Application Priority Data

Oct. 16, 2003   (KR) ............................... 2003-72140

(51) Int. Cl.
*G06F 7/00*   (2006.01)
(52) U.S. Cl. ........................................ 708/492; 708/490
(58) Field of Classification Search .................. 708/492
See application file for complete search history.

(56) References Cited

U.S. PATENT DOCUMENTS

| | | | | |
|---|---|---|---|---|
| 5,227,992 A | * | 7/1993 | Lee et al. ..................... | 708/492 |
| 5,272,661 A | * | 12/1993 | Raghavan et al. ........... | 708/492 |
| 6,049,815 A | * | 4/2000 | Lambert et al. ............. | 708/492 |
| 6,141,786 A | * | 10/2000 | Cox et al. .................... | 714/763 |
| 6,389,442 B1 | * | 5/2002 | Yin et al. ..................... | 708/492 |

FOREIGN PATENT DOCUMENTS

| KR | 2000-0026250 A | 5/2000 |
|---|---|---|
| KR | 2002-0094440 A | 12/2002 |

OTHER PUBLICATIONS

Pincin, A; A new algorithm for multiplication in finite fields; Computers, IEEE Transactions on; vol. 38; Jul. 1989; pp. 1045-1049.*
Rsie-Chia Chang; Reed-Solomon Decoder for Dvd Application; Communications, 1998. ICC 98. Conference Record. 1998 IEEE International Conference on; vol. ; pp. 957-960.*
Wei Baodian et al; Property of finite fields and its cryptography application; Electronic Letters; vol. 39, Issue 8; Apr. 17, 2003; pp. 655-656.*

* cited by examiner

*Primary Examiner*—Lewis A Bullock, Jr.
*Assistant Examiner*—Michael Yaary
(74) *Attorney, Agent, or Firm*—Sughrue Mion, PLLC

(57) ABSTRACT

A method of obtaining C=($c_0, \ldots, c_{n-1}$) of a product of two elements A and B of a finite field GF($2^n$). The method includes permuting the last d coefficients ($a_{n-1}, \ldots, a_{n-d}$) of a multiplier A with predetermined variables ($s_{n-1}, \ldots, s_{n-d}$); operating C:C=⊕($b_{i+j}$●A) for (I+j)$^{th}$ coefficient of a multiplicand B to update coefficients of C, where i and j are integers, and A:=($s_{\ldots, \alpha x-2}$)⊕(0,$x_{n-1-j}$●$f_1, \ldots, s_{x-1-j}$●$f_{x-d}$, 0, . . . ,0) repeatedly for j=0 to (d−1) to update coefficients of A, where ⊕ represents an XOR operation and ● represents an AND operation; and repeatedly performing the permuting and operating by increasing i from 0 to (n−1) by d.

8 Claims, 3 Drawing Sheets

METHOD AND APPARATUS FOR PERFORMING MULTIPLICATION IN FINITE FIELD GF($2^N$)

BACKGROUND OF THE INVENTION

This application claims the priority of Korean Patent Application No. 2003-72140, filed on Oct. 16, 2003, in the Korean Intellectual Property Office, the disclosure of which is incorporated herein in its entirety by reference.

FIELD OF THE INVENTION

The present invention relates to a method and apparatus for performing multiplication in a finite field.

DESCRIPTION OF THE RELATED ART

A finite field GF($2^n$) is a number system containing $2^n$ elements. Based on the fact that each element of the finite field GF($2^n$) can be represented by n bits, practical applications of the finite field can be accomplished. Practical applications, such as implementation of an error correction code or elliptic curve cryptosystem in hardware, frequently perform calculations in GF($2^n$). An apparatus for encoding/decoding Reed-Solomon codes performs calculation in GF($2^n$), and an encryption/decryption apparatus of an elliptic curve cryptosystem performs calculation in GF($2^n$) where "n" is a large value.

The addition and multiplication rules of GF($2^n$), which contains only binary numbers 0 and 1, are defined by Equation (1).

$$0+0=1+1=0$$
$$0+1=1+0=1$$
$$0=0\times 1=0$$
$$1\times 1=1 \quad (1)$$

Here, addition is a bitwise exclusive OR (referred to as XOR hereinafter) operation, and multiplication is a bitwise AND (referred to as AND hereinafter) operation.

Since the finite field GF($2^n$) (n>1) is a number system containing $2^n$ elements, addition and multiplication correspond to arithmetic modulo for an irreducible $n^{th}$-degree polynomial having coefficients in GF(2). The irreducible polynomial of degree n is referred to as a defining polynomial of the finite field. When a root of the defining polynomial is $\alpha$, an element of the finite field has a standard representation given by Equation (2).

$$\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$
$$\alpha_i \in GF(2) \quad (2)$$

Multiplication of two elements in GF($2^n$) is given by polynomial multiplication of $\alpha$ and then a modulo operation by the defining polynomial. Addition of two elements in GF($2^n$) is performed by polynomial addition of $\alpha$.

Multipliers, which perform multiplication in the finite field, can include a serial multiplier, a parallel multiplier, and a systolic multiplier. The serial multiplier has low area complexity, and the parallel multiplier performs multiplication using only a gate delay without latency. Accordingly, the parallel multiplier has high area complexity compared to the serial multiplier, but can reduce time complexity considerably. The systolic multiplier is designed to increase throughput, and thus, has relatively high area and time complexity.

For the serial multiplier among the multipliers, there is a demand for a method and apparatus for performing multiplication in a finite field by means of the serial multiplier that can reduce computational time and minimize the increase in area complexity.

SUMMARY OF THE INVENTION

The present invention provides a method and apparatus for performing multiplication through parallel processing by d bit unit when coefficients of the last d terms in a defining polynomial are assumed to be "0".

According to an aspect of the present invention, there is provided a method of obtaining $C=(c_0,\ldots,c_{n-1})$ of a product of two elements A and B of a finite field GF($2^n$) when a defining polynomial f(x) of degree n in the finite field GF($2^n$) is defined by $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, $d \geq 2$ is an integer, $\alpha$ is a root of the defining polynomial, A and B of the finite field are expressed as $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1})$$

with respect to the root $\alpha$, and C of the product of A and B can be rewritten as C=A×B mod f($\alpha$), the method comprising: permuting the last d coefficients $(a_{n-1},\ldots,a_{n-d})$ of a multiplier A with predetermined variables $(s_{n-1},\ldots,s_{n-d})$; operating C:=C⊕($b_{i+j}$●A) for $(i+j)^{th}$ coefficient of a multiplicand B to update coefficients of C, where i and j are integers, and A:=$(s_{n-1-j},a_0,\ldots,a_{n-2})$⊕$(0,s_{n-1-j}$●$f_1,\ldots,s_{n-1-j}$●$f_{n-d},0,\ldots,0)$ repeatedly for j=0 to (d−1) to update coefficients of A, where ⊕ represents an XOR operation and ● represents an AND operation; and repeatedly performing the permuting and operating by increasing i from 0 to (n−1) by d.

According to another aspect of the present invention, there is provided an apparatus for obtaining $C=(c_0,\ldots,c_{n-1})$, of a product of two elements A and B of a finite field GF($2^n$) when a defining polynomial f(x) of degree n in GF($2^n$) is defined by $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, $d \geq 2$, d is an integer, $\alpha$ is a root of the defining polynomial, A and B of the finite field are expressed as $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1})$$

with respect to the root $\alpha$, and C of the product of A and B can be rewritten as C=A×B mod f($\alpha$), the apparatus comprising: a multiplier storage unit, which stores coefficients of a multiplier A; a multiplicand storage unit, which stores coefficients of a multiplicand B; a product storage unit, which stores C of the product of A and B; a multiplication unit, which performs operations of the following Equation $$C:=C\oplus(b_{i+j}\bullet A),$$

repeatedly, for j=0 to (d−1), where i and j are integers, ⊕ represents an XOR operation, and ● represents an AND operation, repeatedly performs the above steps by increasing the variable i from 0 to (n−1) by d to obtain updated coefficients of C, and outputs the updated coefficients of C to the product storage unit; and a multiplier updating unit, which performs operations of the following Equation $$A:=(s_{n-1-j},\alpha_0,\ldots,\alpha_{n-2})\oplus(0,s_{n-1-j}\bullet f_1,\ldots,s_{n-1-j}\bullet f_{n-d},0,\ldots,0)$$

to update the coefficients of A, where i and j are integers, $\oplus$ represents an XOR operation, and $\bullet$ represents an AND operation, and outputs the updated coefficients of A to the multiplier storage unit.

According to still another aspect of the present invention, there is provided a method of obtaining $C=(c_0,\ldots,c_{n-1})$, of the product of two elements A and B of a finite field $GF(2^n)$ when a defining polynomial f(x) of degree n in $GF(2^n)$ is defined as $$f(x)=x^n+h(x)=x^n+(f_{n-1}x^{n-1}+\ldots+f_1x+f_0), f_i\in\{0,1\},$$

where $f_{n-1}=\ldots=f_{n-d+1}=0$, $d\geq 2$, d is an integer, $\alpha$ is a root of the defining polynomial, A and B of the finite field have a standard representation with respect to $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

the root $\alpha$ as shown in $$B=b_0+b_1\alpha+b_2\alpha^2+\ldots+b_{n-1}\alpha^{n-1}=(b_0,b_1,b_2,\ldots,b_{n-1}),$$

A', a dual representation of A, is expressed as $$A'=(\alpha_0',\alpha_1',\alpha_2',\ldots,\alpha_{n-1}'),$$

and C can be written as $C=A\times B \mod f(\alpha)$, the method comprising: converting A into A'; operating of the following formulae $$s_j:=\alpha_j'\oplus(f_1\bullet\alpha_{j+1}')\oplus\ldots\oplus(f_{n-d}\bullet\alpha_{n-d+j}')$$

$$c_{i+j}':=(b_0\bullet\alpha_j')\oplus\ldots\oplus(b_{n-1-j}\bullet\alpha_{n-1}')\oplus(b_{n-j}\bullet s_0)\oplus\ldots\oplus(b_{n-1}\bullet s_{j-1})$$

repeatedly for i, j=0 to d−1 to update coefficients of C', which is a dual representation of C, where i and j are integers, $c_{i+j}$, is a dual representation of $c_{i+j}$; shifting A' left d times to update A'; updating the last d coefficients of A' with $s_j$; repeatedly performing the operating, shifting, and updating by increasing the variable i from 0 to (n−1) by d to obtain updated coefficients of C'; and performing basis conversion on the updated C'.

According to yet another aspect of the present invention, there is provided an apparatus for obtaining $C=(c_0,\ldots,c_{n-1})$, of a product of two elements A and B of a finite field $GF(2^n)$ when a defining polynomial f(x) of degree n in $GF(2^n)$ is defined as $$f(x)=x^n+h(x)=x^n+(f_{n-1}x^{n-1}+\ldots+f_1x+f_0), f_i\in\{0,1\},$$

where $f_{n-1}=\ldots=f_{n-d+1}=0$, $d\geq 2$, d is an integer, $\alpha$ is a root of the defining polynomial, the two elements A and B of the finite field have a standard representation with respect to the root $\alpha$ as shown in $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1}),$$

A', a dual representation of A, is expressed as $$A'=(\alpha_0',\alpha_1',\alpha_2',\ldots,\alpha_{n-1}'),$$

and C of A and B is rewritten as $C=A\times B \mod f(\alpha)$, the apparatus comprising: a basis converting unit, which converts the standard representation into a dual representation, or converts the dual representation into the standard representation; a multiplicand storage unit, which stores coefficients of a multiplicand B; a multiplier storage unit, which stores coefficients of A' obtained by converting basis, of a multiplier A by means of the basis converting unit; a multiplier updating unit, which updates the coefficients of A' according to a predetermined Equation and outputs the updated coefficients to the multiplier storage unit; and an operation unit, which includes a plurality of multipliers multiplying each $m^{th}$ coefficient from the multiplicand storage unit by each $(m+j)^{th}$ coefficient from the multiplier storage unit where j varies from 0 to (d−1) and multiply the last j coefficients from the multiplicand storage unit by a part of outputs from the multiplier updating unit, and a plurality of logic operation members fort performing XOR operations on only outputs containing the $(m+j)^{th}$ coefficients from the plurality of multipliers and output the last d $c_i$'s, wherein after C' is obtained by the operation unit, the basis converting unit converting basis of C' to obtain C.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
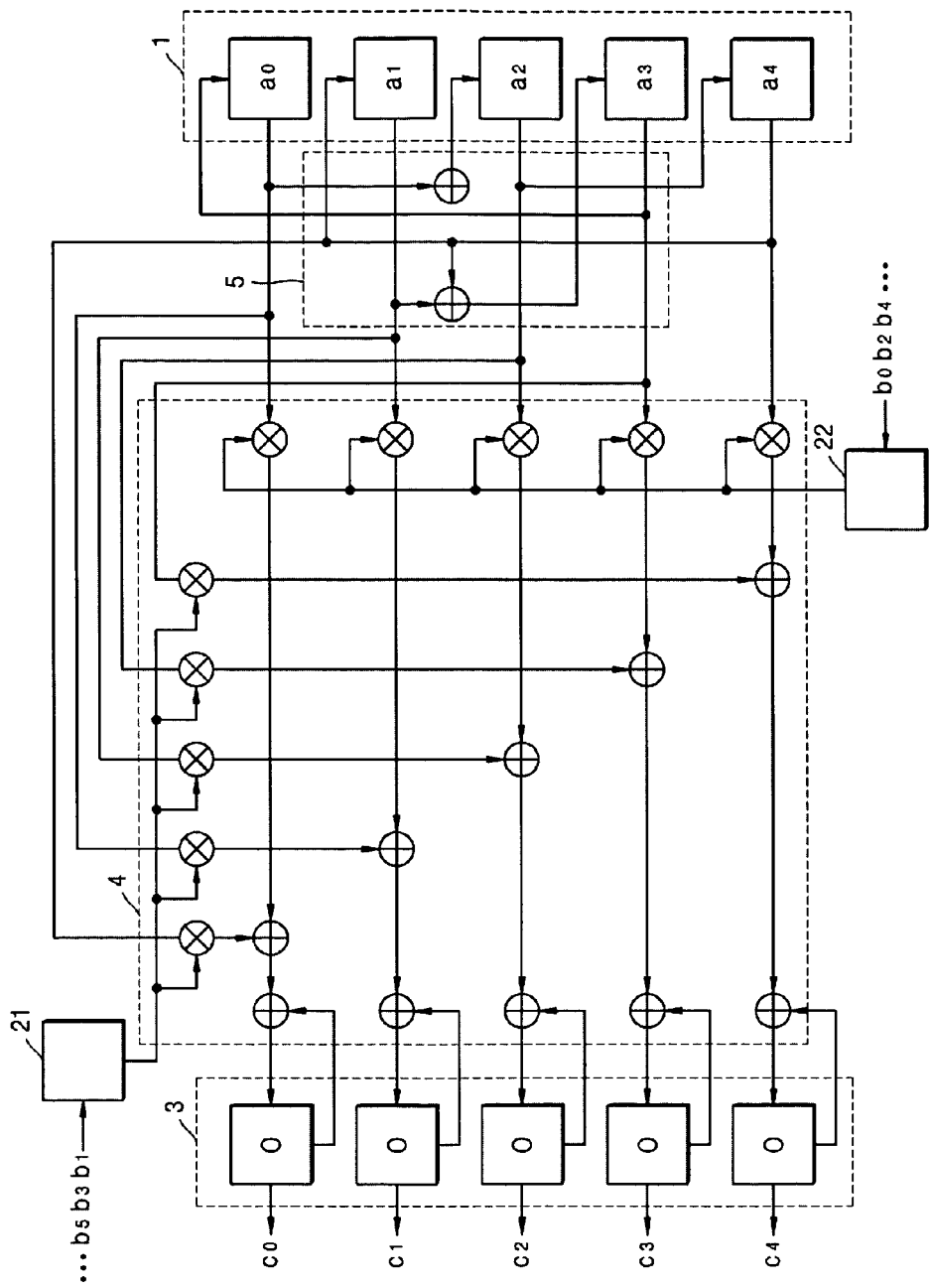
FIG. 1 illustrates a configuration of an apparatus for performing multiplication using a standard basis according to a first exemplary embodiment of the present invention.

The present invention will now be described more fully with reference to the accompanying drawings, in which exemplary embodiments of the invention are shown.

A defining polynomial f(x) of a finite field $GF(2^n)$ is represented by Equation 3.

$$f(x)=x^n+h(x)=x^n+(f_{n-1}x^{n-1}+\ldots+f_1x+f_0), f_i\in\{0,1\} \quad (3)$$

If $\alpha$ is a root of the defining polynomial, h(a) is defined by Equation 4.

$$h(\alpha)=(f_0,f_1,f_2,\ldots,f_{n-1}) \quad (4)$$

Assume that $\oplus$ represents a bitwise XOR operation and $\bullet$ represents a bitwise AND operation. An operation $\bullet$ between a bit and a vector is defined by Equation 5.

$$\alpha\bullet(c_0,\ldots,c_{n-1})=(\alpha\bullet c_0,\ldots,\alpha\bullet c_{n-1}), \text{ where } \alpha, c_i=\{0,1\} \quad (5)$$

Shift operations designated by >> and << are defined as follows. $(\alpha_0,\ldots,\alpha_{n-1})>>1$ means that each coefficient is shifted right once as shown in Equation 6.

For [i=n−1 to 1]

$$\alpha_i:=\alpha_{i-1}$$

$$\alpha_0:=0 \quad (6)$$

$(\alpha_0, \ldots, \alpha_{n-1}) << 1$ means that each coefficient is shifted left once as shown in Equation 7.

For [i=0 to n−2]

$\alpha_i := \alpha_{i+1}$ $\alpha_{n-1} := 0$     (7)

Two bases, i.e., a standard basis and a dual basis, are used for multiplication of two elements of the finite field according to an embodiment of the present invention.

First, multiplication using the standard basis will now be explained.

When the standard basis is used, two elements A and B of $GF(2^n)$ may be defined by Equation 8.

$A = \alpha_0 + \alpha_1\alpha + \alpha_2\alpha^2 + \ldots + \alpha_{n-1}\alpha^{n-1} = (\alpha_0, \alpha_1, \alpha_2, \ldots, \alpha_{n-1})$, $B = b_0 + b_1\alpha + b_3\alpha^2 + \ldots + b_{n-1}\alpha^{n-1} = (b_0, b_1, b_2, \ldots, b_{n-1})$     (8)

A product C of A and B is defined by Equation 9.

$C = A \times B \bmod f(\alpha)$     (9)

Here, × represents polynomial multiplication.

Equation 9 can be expanded as a code expression in Equation 10.

$C := (0, \ldots, 0)$

For [i=0 to n−1]

$C := C \oplus (b_i \bullet A)$ $A := (A >> 1) \oplus (\alpha_{n-1} \bullet h(\alpha))$ Rename coefficients of the element A as $\alpha_0, \ldots, \alpha_{n-1}$     (10)

Multiplication according to Equation 10 will now be explained in detail. An $i^{th}$ coefficient of a multiplicand B is multiplied by each coefficient of a multiplier A, and an exclusive OR (XOR) operation is performed on the results of the multiplication and previous coefficients of the product C, thereby updating the respective coefficients of the product C. Also, a coefficient of a term with the highest power of A is multiplied by each coefficient of terms other than the term with the highest power in the defining polynomial of the finite field. The multiplication results are XORed with once rightly shifted coefficients of A, thereby updating the respective coefficients of the A. Final C is obtained by repeating the above-described process n times.

Changes of the multiplier A within the for loop in the multiplication algorithm of Equation 10 will now be explained. When i=k, it is assumed that $f_{n-1} = \ldots = f_{x-d+1} = 0$, $b_k \bullet A$, and $s_{n-1} := \alpha_{n-1}, \ldots, s_{n-d} := \alpha_{n-d}$ $(d \geq 2)$.

When i=k+1, A may be defined by Equation 11, based on Equation 10.

$A = (s_{n-1}, \alpha_0, \ldots, \alpha_{n-2}) \oplus (0, s_{n-1} \bullet f_{n-d}, 0, \ldots, 0)$     (11)

When i=k+2, A may be expressed by Equation 12, based on Equation 10.

$A = (s_{n-2}, s_{n-1}, \alpha_0, \ldots, \alpha_{n-3}) \oplus (0, 0, s_{n-1} \bullet f_1, \ldots, s_{n-1} \bullet f_{n-d}, 0, \ldots, 0) \oplus (0, s_{n-2} \bullet f_1, \ldots, s_{n-2} \bullet f_{n-d}, 0, \ldots, 0)$     (12)

In the same manner, when i=k+d, A may be defined by Equation 13, based on Equation 10.

$A = (s_{n-d}, \ldots, s_{n-1}, \alpha_0, \ldots, \alpha_{n-d-1}) \oplus (0, \ldots, 0, s_{n-1} \bullet f_1, \ldots, s_{n-1} \bullet f_{n-d}) \oplus 0 \ldots \oplus (0, s_{n-d} \bullet f_1, \ldots, s_{n-d} \bullet f_{n-d}, 0, \ldots, 0)$     (13)

Accordingly, when i=k+d, d-bit parallel processing can be done by assumption. Further, if d is small enough, it satisfies most practical cases, that is, parameters of the elliptic curve cryptosystem according to SEC and ANSI X9.62 standards, thereby not violating practicability.

Multiplication using the standard basis on which the d-bit parallel processing can be performed can be represented using code expressions. That is, C, the product of A and B, can be represented by Equation 14 when $f_{n-1} = \ldots = f_{n-d+1} = 0$.

$C := (0, \ldots, 0)$

For [i=0 to n−1, i=i+d]

Let $s_{n-1} := \alpha_{n-1}, \ldots, s_{n-d} := \alpha_{n-d}$

For [j=0 to d−1, j++]

$C := C \oplus (b_{i+j} \bullet A)$ $A := (s_{n-1-j}, \alpha_0, \ldots, \alpha_{n-2}) \oplus (0, s_{n-1-j} \bullet f_1, \ldots, s_{n-1-j} \bullet f_{n-d}, 0, \ldots, 0)$ Rename the coefficients of A as $\alpha_0, \ldots, \alpha_{n-1}$     (14)

In multiplication according to Equation 14, the process described with reference to Equation 10 are performed by d bit unit. Consequently, time complexity can be improved d times and the increase in area complexity can be minimized.

FIG. 1 illustrates a configuration of an apparatus for performing multiplication using the standard basis according to Equation 14 when n=5, $f(x) = x^5 + x^2 + 1$, and d=2. The apparatus includes a multiplier storage unit 1, which stores coefficients of the multiplier A, multiplicand storage units 21 and 22, which store coefficients of the multiplicand B, a product storage unit 3, which stores coefficients of the product result, a multiplication unit 4, and a multiplier updating unit 5.

Here, each of the multiplicand storage units 21 and 22 includes d partial storage units. For a $k^{th}$ coefficient of the multiplicand B, when k is modulo operated by d, coefficients corresponding to the same modulo operation results are sorted out and stored into each partial storage unit. Since the shown multiplicand storage units 21 and 22 correspond to a case of d=2, each of them includes a first partial storage unit 21, which stores only coefficients of odd terms, and a second partial storage unit 22, which stores only coefficients of even terms.

The multiplication unit 4 includes a plurality of multipliers and XOR operators. The multipliers form d sets corresponding to multiplicand coefficients stored in the partial storage units 21 and 22. An $m^{th}$ multiplier of the respective d sets of multipliers multiplies an $m^{th}$ multiplicand coefficient output from the corresponding partial storage unit by an $m^{th}$ multiplier coefficient output from the multiplier storage unit 1.

Results of the multiplication are XORed by an $m^{th}$ XOR operator and then added to pertinent coefficients in the product storage unit 3. That is, the multiplication and XOR operation are performed by d bits according to $C := C \oplus (b_{i+j} \bullet A)$ of Equation 14 and results of the multiplication and XOR operation are stored in the product storage unit 3. The multiplier updating unit 5 updates multiplier coefficients according to $A := (s_{n-1-j}, \alpha_0, \ldots, \alpha_{n-2}) \oplus (0, s_{n-1-j} \bullet f_1, \ldots, s_{n-1-j} \bullet f_{n-d}, 0, \ldots, 0)$ of Equation 14 to be stored in the multiplier storage unit 1, respectively.

After 1 cycle, A becomes $A = (\alpha_3, \alpha_4, \alpha_0, \alpha_1, \alpha_2) \oplus (0, 0, 0, \alpha_4, 0) \oplus (0, 0, \alpha_3, 0, 0) = (\alpha_3, \alpha_4, \alpha_0 \oplus \alpha_3, \alpha_1 \oplus \alpha_4, \alpha_2)$ according to Equation 14.

Multiplication using a dual basis according to an embodiment of the present invention will now be explained.

In the multiplication using the dual basis, a product is obtained by performing multiplication of a multiplier in a dual basis and a multiplicand in a standard basis.

Consider two elements A and B in $GF(2^n)$ represented by Equation 15.

$$A = \alpha_0 + \alpha_1 \alpha + \alpha_2 \alpha^2 + \ldots + \alpha_{n-1} \alpha^{n-1} = (\alpha_0, \alpha_1, \alpha_2, \ldots, \alpha_{n-1}),$$

$$B = b_0 + b_1 \alpha + b_2 \alpha^2 + \ldots + b_{n-1} \alpha^{n-1} = (b_0, b_1, b_2, \ldots, b_{n-1}) \quad (15)$$

Assuming that A', a dual representation of A, is expressed as $$A' = (\alpha_0', \alpha_1', \alpha_2', \ldots, \alpha_{n-1}'),$$

C, the product between A and B, is expressed as $$C = (c_0, \ldots, c_{n-1}),$$

and C', a dual representation of C, is expressed as $$C' = (c_0', \ldots, c_{n-1}'),$$

C can be represented using code expression as shown in Equation 16.

A'←A (basis conversion)

For [i=0 to n−1]

$c_i' := (b_0 \bullet \alpha_0') \oplus \ldots \oplus (b_{n-1} \bullet \alpha_{n-1}')$ $t := (f_0 \bullet \alpha_0') \oplus \ldots \oplus (f_{n-1} \bullet \alpha_{n-1}')$

A':=A'<<1

Rename coefficients of A as $\alpha_0', \ldots, \alpha_{n-1}'$ $\alpha_{n-1}' := k$ C←C' (basis conversion)     (16)

Multiplication according to Equation 16 will now be explained in detail. First, the multiplier A is converted from the standard basis into the dual basis. $c_i'$, $i^{th}$ multiplication result, in the dual basis is obtained by multiplying coefficients of A' in the dual basis by coefficients of the multiplicand B and performing an XOR operation on the results of the multiplication. A coefficient of the highest power term of A' is updated to k where k is obtained by multiplying coefficients of terms other than the term with the highest power in the defining polynomial of the finite field by coefficients of A', performing XOR operations on results of the multiplication, and shifting the coefficients of A' left once. After these steps are repeated n times, C' is converted into the standard basis.

Changes of A' within the for loop of Equation 16 will now be explained. If A' is expressed as $$A' = (\alpha_0', \alpha_1', \alpha_2', \ldots, \alpha_{n-1}')$$

when i=k, A' may be represented by Equation 17 with $f_{n-1} = \ldots = f_{n-d+1} = 0$ when i=k+1.

$$A' = (\alpha_1', \alpha_2', \ldots, \alpha_{n-1}', (\alpha_0' \oplus (f_1 \bullet \alpha_1') \oplus \ldots \oplus (f_{n-d} \bullet \alpha_{n-d}'))) \quad (17)$$

When i=k+d, A' may be defined by Equation 18.

$$A' = (\alpha_d', \ldots, \alpha_{n-1}', (\alpha_0' \oplus (f_1 \bullet \alpha_1') \oplus \ldots \oplus (f_{n-d} \bullet \alpha_{n-d}')), \ldots, (\alpha_{d-1}' \oplus (f_1 \bullet \alpha_d') \oplus \ldots \oplus (f_{n-d} \bullet \alpha_{n-1}'))) \quad (18)$$

When i=k+d, d-bit parallel processing can be performed on A' by assumption. Further, if the integer d is small enough, it satisfies most practical cases, that is, parameters of the elliptic curve cryptosystem in SEC and ANSI X9.62 standards, thereby not violating practicability.

Multiplication using the dual basis on which the d-bit parallel processing can be performed can be represented using code expression. That is, C, the product of A and B, may be expressed by Equation 19 when $f_{n-1} = f_{n-d+1} = 0$.

A'←A (basis conversion)

For [i=0 to n−1, i=i+d]

For [j=0 to d−1, j++]

$s_j := \alpha_j' \oplus (f_1 \bullet \alpha_{j+1}') \oplus \ldots \oplus (f_{n-d} \bullet \alpha_{n-d+j}')$ $c_{i+j}' := (b_0 \bullet \alpha_j') \oplus \ldots \oplus (b_{n-1-j} \bullet \alpha_{n-1}') \oplus (b_{n-j} \bullet s_0) \oplus \ldots \oplus (b_{n-1} \bullet s_{j-1})$ A':=A'<<d Rename the coefficients of A' as $\alpha_0', \ldots, \alpha_{n-1}'$ For [j=0 to d−1, j++]

$\alpha_{n-d+j}' := s_j$

C←C' (basis conversion)     (19)

In multiplication according to Equation 19, the process described with reference to Equation 16 are performed by d bit unit. Consequently, time complexity can be improved d times and the increase in area complexity can be minimized.

Figure 2:
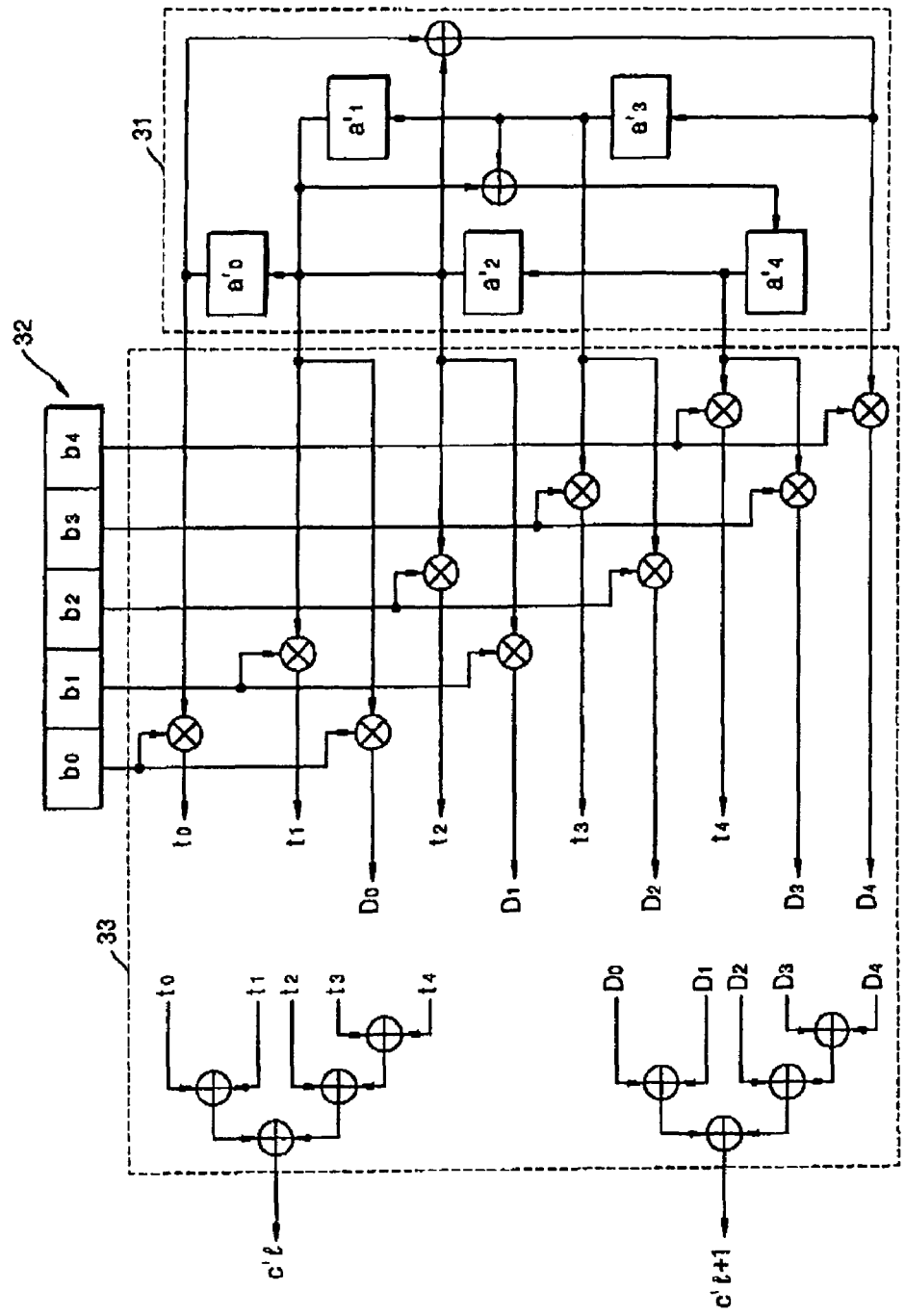
FIG. 2 illustrates a configuration of an apparatus for performing multiplication using a dual basis according to a second exemplary embodiment of the present invention.

FIG. 2 illustrates a configuration of an apparatus for performing multiplication using a dual basis when n=5, $f(x) = x^5 + x^2 + 1$, and d=2. The apparatus includes a multiplier storing and updating unit 31, which stores coefficients of a multiplier and calculates values to be updated, a multiplicand storage unit 32, and an operation unit 33. Here, a basis converting unit, which converts $a_i$ into $\alpha_i'$ or $c_i'$ into $c_i$, is not shown.

The multiplier storing and updating unit 31 performs operations according to Equation 20 in Equation 19 to obtain coefficients in the dual basis.

A':=A'<<d

Rename the coefficients of A' as $\alpha_0', \ldots, \alpha_{n-1}'$

For [j=0 to d−1, j++]

$\alpha_{n-d+j}' := s_j$     (20)

The operation unit 33 performs an operation corresponding to $c_{i+j}' := (b_0 \bullet \alpha_j') \oplus \ldots \oplus (b_{n-1-j} \bullet \alpha_{n-1}') \oplus (b_{n-j} \bullet s_0) \oplus \ldots \oplus (b_{n-1} \bullet s_{j-1})$ in Equation 19, wherein $a' = (a_0', \ldots, a_n')$, multiplier coefficients, output from the multiplier storing and updating unit 31 and $b = (b_0, \ldots, b_n)$, multiplicand coefficients, output from the multiplicand storage unit 32. That is, the operation unit 33 multiplies $m^{th}$ multiplicand coefficients by $(m+j)^{th}$ multiplier coefficients and performs XOR operations on results of the multiplication. The final j multiplicand coefficients are multiplied by coefficients $s_0, \ldots, s_{j-1}$, which are obtained by $s_j := \alpha_j' \oplus (f_1 \bullet \alpha_{j+1}') \oplus \ldots \oplus (f_{n-d} \bullet \alpha_{n-d+j}')$, and the coefficients $s_0, \ldots, s_{j-1}$ are determined by a', which is updated using Equation 20.

Accordingly, after 1 cycle, A' becomes $A' = (\alpha_2', \alpha_3', \alpha_4', \alpha_0' \oplus \alpha_2', \alpha_1' \oplus \alpha_3')$. Further, $c_i'$ becomes $(b_0 \bullet \alpha_0') \oplus (b_1 \bullet \alpha_1') \oplus (b_2 \bullet \alpha_2') \oplus (b_3 \bullet \alpha_3') \oplus (b_4 \bullet \alpha_4')$, and $c_{i+1}'$ becomes $(b_0 \bullet \alpha_1') \oplus (b_1 \bullet \alpha_2') \oplus (b_2 \bullet \alpha_3') \oplus (b_3 \bullet \alpha_4') \oplus (b_4 \bullet (\alpha_0' \oplus \alpha_2'))$.

The reference numerals $t_0$-$t_4$ and $D_0$-$D_4$ have been used in FIG. 2 so that the operations of the operation unit 33 are more easily understood.

Figure 3:
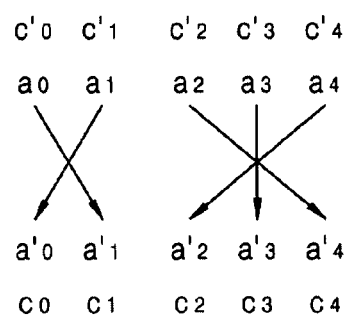
FIGS. 3 and 4 illustrate embodiments of basis converting means for multiplication based on a dual basis.
Figure 4:
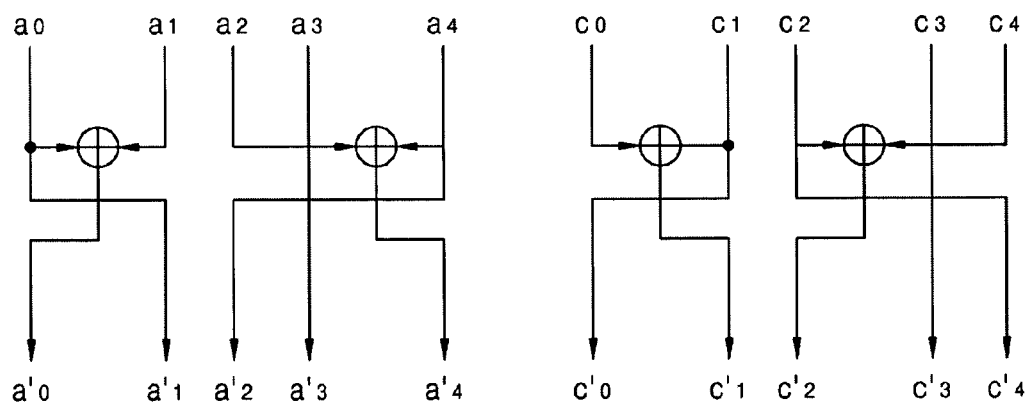

FIGS. 3 and 4 illustrates embodiments of basis converting means for multiplication based on the dual basis. The basis converting members shown in FIGS. 3 and 4 are the same as disclosed in Korean Patent Application No. 200-0069460 filed by the applicant of the present invention. Referring to FIGS. 3 and 4, basis conversion can be realized by simply changing the order of coefficients of the polynomial or performing XOR operations, which are relatively simple.

Table 1 shows the performance of the apparatus for performing multiplication using the standard basis.

TABLE 1

| Defining polynomial | Area complexity | Maximum delay | Latency (cycles) |
|---|---|---|---|
| Trinomial | A: dn, X: dn + d, R: 2n + d | $T_A + (d+1)T_X$ | n/d |
| Pentanomial | A: dn, X: dn + 3d, R: 2n + d | $T_A + (d+3)T_X$ | n/d |

Here, A represents a two input AND gate, X represents a two input XOR gate, R represents a register, $T_A$ represents an AND gate delay, $T_X$ represents an XOR gate delay, n represents a dimension, and d represents the number of bits in parallel processing.

Table 2 shows the performance of the apparatus for performing multiplication using the dual basis.

TABLE 2

| Defining polynomial | Area complexity | Maximum delay | Latency (cycles) |
|---|---|---|---|
| Trinomial | A: dn, X: dn, R: 2n | $T_A + (d+1)T_X$ | n/d |
| Pentanomial | A: dn, X: dn + 2d, R: 2n | $T_A + (\log_2 n)T_X$ | n/d |

Performance values of the basis converting means are excluded from Table 2.

Here, A represents a two input AND gate, X represents a two input XOR gate, R represents a register, $T_A$ represents an AND gate delay, $T_X$ represents an XOR gate delay, n represents a dimension, and d represents the number of bits in parallel processing.

Table 3 shows the performance of the apparatus for performing multiplication according to an embodiment of the present invention using 0.18 um process technology of Samsung Electronics Co., Ltd. with the performance values described above.

TABLE 3

| Basis | Area complexity (# of NANDs) | Maximum delay (nano-sec.) | Latency (Cycles) |
|---|---|---|---|
| Standard d = 8 | 13129.7 | 3.707 | 35 |
| Dual d = 8 | 13102.3 | 2.793 | 35 |
| Standard d = 4 | 8169.5 | 2.427 | 71 |
| Dual d = 4 | 8176.8 | 2.793 | 71 |
| Standard d = 2 | 5689.3 | 1.147 | 142 |
| Dual d = 2 | 5714.0 | 2.793 | 142 |

Here, the apparatus for performing multiplication based on the dual basis includes the basis converting means.

According to Table 3, when computational speed doubled, area complexity increased approximately 1.43 to 1.61 times. Therefore, the area complexity does not rise rapidly.

As described above, since the apparatus according to an embodiment of the present invention performs the serial multiplication allowing the d-bit parallel processing, the apparatus is faster for arithmetic operation than the conventional serial multiplier and can minimize the increase of area complexity. Furthermore, an expected maximum delay of 100 MHz is within one clock cycle. Accordingly, the apparatus can be effectively applied to terminals having a low clock speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing multiplication through d-bit parallel processing using a serial multiplier by obtaining $C=(c_0, \ldots, c_{n-1})$ of a product of two elements A and B of a finite field $GF(2^n)$ when a defining polynomial f(x) of degree n in the finite field $GF(2^n)$ is defined by $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, $d \geq 2$, d is an integer, $\alpha$ is a root of the defining polynomial, A and B of the finite field are expressed as $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1})$$

with respect to the root $\alpha$, and C of the product of A and B can be rewritten as $C=A \times B \mod f(\alpha)$, the method comprising:

permuting the last d coefficients $(a_{n-1}, \ldots, a_{n-d})$ of a multiplier, which is A, with predetermined variables $(s_{n-1}, \ldots, s_{n-d})$;

operating $C:=C \oplus (b_{i+j} \bullet A)$ for $(i+j)^{th}$ coefficient of a multiplicand, which is B, to update coefficients of C, where i and j are integers, and $$A:=(s_{n-1-j}\alpha_0, \ldots, \alpha_{n-2}) \oplus (0, s_{n-1-j}f_1, \ldots, s_{n-1-j} \bullet f_{n-d}, 0, \ldots, 0)$$

repeatedly for j=0 to (d-1) to update coefficients of A, where $\oplus$ represents an XOR operation and $\bullet$ represents an AND operation; and repeatedly performing the permuting and operating by increasing i from 0 to (n-1) by d to obtain a final product C.

2. An apparatus for performing multiplication through d-bit parallel processing using a serial multiplier by obtaining $C=(c_0, \ldots, c_{n-1})$, of a product of two elements A and B of a finite field $GF(2^n)$ when a defining polynomial f(x) of degree n in $GF(2^n)$ is defined by $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, $d \geq 2$, d is an integer, $\alpha$ is a root of the defining polynomial, the two elements A and B of the finite field are expressed as $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1})$$

with respect to the root $\alpha$, and C of the product of A and B can be rewritten as $C=A \times B \mod f(\alpha)$, the apparatus comprising:

a multiplier storage unit, which stores coefficients of a multiplier, which is A;

a multiplicand storage unit, which stores coefficients of a multiplicand, which is B;

a product storage unit, which stores C of the product of A and B;

a multiplication unit, which performs operations of the Equation C:=C⊕($b_{i+j}$●A), repeatedly, for j=0 to (d−1), where i and j are integers, ⊕ represents an XOR operation, and ● represents an AND operation, repeatedly performs the above steps by increasing the variable i from 0 to (n−1) by d to obtain updated coefficients of C, and outputs the updated coefficients of C to the product storage unit; and a multiplier updating unit, which performs operations of the Equation A:=($s_{n-1-j}$,$\alpha_0$, ... ,$\alpha_{n-2}$)⊕(0,$s_{n-1-j}$●$f_1$,...,$s_{n-1-j}$●$f_{n-d}$,0,...,0) to update the coefficients of A, where i and j are integers, ⊕ represents an XOR operation, and ● represents an AND operation, and outputs the updated coefficients of A to the multiplier storage unit.

3. The apparatus of claim 2, wherein the multiplicand storage unit includes d partial storage unit, and each partial storage unit stores coefficients having the same modulo operation results when for a $k_{th}$ coefficient of the multiplicand, the value k is modulo operated by d.

4. The apparatus of claim 3, wherein the multiplication unit includes:

d sets of multipliers, which correspond to the partial storage unit and respectively multiply multiplicand coefficients output from the partial storage unit by multiplier coefficients output from the multiplier storage unit; and a plurality of logic operation members, which perform a first XOR operation on outputs from an $m^{th}$ multiplier of each set of the multipliers, perform a second XOR operation on a result of the first XOR operation with a value stored in an $m^{th}$ location of the product storage unit, and output the result of the second XOR operation to the product storage unit.

5. A method of performing multiplication in a serial multiplier using a dual basis, where a product is obtained by performing multiplication with a multiplier in a dual basis and a multiplicand in a standard basis by obtaining C=($c_0$, ..., $c_{n-1}$), of the product of two elements A and B of a finite field $GF(2^n)$ when a defining polynomial f(x) of degree n in $GF(2^n)$ is defined as $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, d≧2, d is an integer, $\alpha$ is a root of the defining polynomial, A and B of the finite field have a standard representation with respect to the root $\alpha$ as shown in $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1}),$$

A', a dual representation of A, is expressed as A'=($\alpha_0'$,$\alpha_1'$,$\alpha_2'$,...,$\alpha_{n-1}'$) and C can be rewritten as C=A×B mod f($\alpha$), the method comprising:

converting A into A';

operating of the following formulae $$s_j:=\alpha_j'\oplus(f_1\bullet\alpha_{j+1}')\oplus\ldots\oplus(f_{n-d}\bullet\alpha_{n-d+j}')$$

$$c_{i+j}':=(b_0\bullet\alpha_j')\oplus\ldots\oplus(b_{n-1-j}\bullet\alpha_{n-1}')\oplus(b_{n-j}\bullet s_0)\oplus\ldots\oplus(b_{n-1}\bullet s_{j-1})$$

repeatedly for i, j=0 to d−1 to update coefficients of C', which is a dual representation of C, where i and j are integers, $c_{i+j}'$ is a dual representation of $c_{i+j}$;

shifting A' left d times to update A';

updating the last d coefficients of A' with $s_j$;

repeatedly performing the operating, shifting, and updating by increasing the variable i from 0 to (n−1) by d to obtain updated coefficients of C'; and performing basis conversion on the updated C' to obtain a final product C.

6. An apparatus for performing multiplication using a dual basis, where a product is obtained by performing multiplications of a multiplier in a dual basis and a multiplicand in a standard basis obtaining C=($c_0$, ..., $c_{n-1}$), of a product of two elements A and B of a finite field $GF(2^n)$ when a defining polynomial f(x) of degree n in $GF(2^n)$ is defined as $$f(x)=x^n+h(x)=x^n+(f_{n-1}x^{n-1}+\ldots+f_1x+f_0), f_i \in \{0,1\},$$

where $f_{n-1}=\ldots=f_{n-d+1}=0$, d≧2, d is an integer, $\alpha$ is a root of the defining polynomial, A and B of the finite field have a standard representation with respect to the root $\alpha$ as shown in $$A=\alpha_0+\alpha_1\alpha+\alpha_2\alpha^2+\ldots+\alpha_{n-1}\alpha^{n-1}=(\alpha_0,\alpha_1,\alpha_2,\ldots,\alpha_{n-1}),$$

$$B=b_0+b_1\alpha+b_2\alpha^2+\ldots+b_{n-1}\alpha^{n-1}=(b_0,b_1,b_2,\ldots,b_{n-1}),$$

A', a dual representation of A, is expressed as A'=($\alpha_0'$,$\alpha_1'$,$\alpha_2'$,...,$\alpha_{n-1}'$), and C of A and B is rewritten as C=A×B mod f($\alpha$), the apparatus comprising:

a basis converting unit, which converts the standard representation into a dual representation, or converts the dual representation into the standard representation;

a multiplicand storage unit, which stores coefficients of a multiplicand B;

a multiplier storage unit, which stores coefficients of A' obtained by converting basis of a multiplier A by means of the basis converting unit;

a multiplier updating unit, which updates the coefficients of A' according to a predetermined Equation and outputs the updated coefficients to the multiplier storage unit; and an operation unit, which includes a plurality of multipliers multiplying each $m^{th}$ coefficient from the multiplicand storage unit by each $(m+j)^{th}$ coefficient from the multiplier storage unit where j varies from 0 to (d−1) and multiply the last j coefficients from the multiplicand storage unit by a part of outputs from the multiplier updating unit, and a plurality of logic operation members fort performing XOR operations on only outputs containing the $(m+j)^{th}$ coefficients from the plurality of multipliers and output the last d $c_i$'s, wherein after C' is obtained by the operation unit module, and the basis converting unit converts basis of C' to obtain C.

7. The apparatus of claim 6, wherein the operation unit performs operations of the Equation $$s_j:=\alpha_j'\oplus(f_1\bullet\alpha_{j+1}')\oplus\ldots\oplus(f_{n-d}\bullet\alpha_{n-d+j}')$$

$$c_{i+j}':=(b_0\bullet\alpha_j')\oplus\ldots\oplus(b_{n-1-j}\bullet\alpha_{n-1}')\oplus(b_{n-j}\bullet s_0)\oplus\ldots\oplus(b_{n-1}\bullet s_{j-1})$$

repeatedly for j=0 to (d−1), where i and j are integers, $c_{i+j}'$ is a dual representation of $c_{i+j}$, using the plurality of multipliers and logic operation members, outputs d coefficients of C', which is a dual representation of C, and obtains $c_{i+j}'$, which is a dual representation of an $(i+j)^{th}$ coefficient of C, by increasing the variable i from 0 to (n−1) by d.

8. The apparatus of claim 6, wherein the multiplier updating unit:

shifts A' stored in the multiplier storage unit, left d times to update A'; and performs operations of the Equation $$s_j:=\alpha_j'\oplus(f_1\bullet\alpha_{j+1}')\oplus\ldots\oplus(f_{n-d}\bullet\alpha_{n-d+j}')$$

$\alpha_{n-d+j}':=s_j$ repeatedly for j=0 to (d−1) to update the last d coefficients of A'.

* * * * *